United States Patent
Korres et al.

(10) Patent No.: US 11,263,329 B2
(45) Date of Patent: Mar. 1, 2022

(54) METHOD, COMPUTER-READABLE MEDIUM, SYSTEM AND VEHICLE COMPRISING THE SYSTEM FOR PROVIDING A DATA RECORD OF A VEHICLE TO A THIRD PARTY

(71) Applicant: Bayerische Motoren Werke Aktiengesellschaft, Munich (DE)

(72) Inventors: Edmund Korres, Munich (DE); Peter Rohrauer, Hoerlkofen (DE); Thomas Wagner, Haar (DE); Oliver Wick, Hohenkammer (DE); Sebastian Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 365 days.

(21) Appl. No.: 16/590,568

(22) Filed: Oct. 2, 2019

(65) Prior Publication Data
US 2020/0034552 A1  Jan. 30, 2020

Related U.S. Application Data

(63) Continuation of application No. PCT/EP2018/061171, filed on May 2, 2018.

(30) Foreign Application Priority Data

May 19, 2017 (DE) ..................... 10 2017 208 503.7

(51) Int. Cl.
*G06F 21/64* (2013.01)
*G06F 21/60* (2013.01)
(Continued)

(52) U.S. Cl.
CPC ............ *G06F 21/602* (2013.01); *G06F 16/27* (2019.01); *G06F 21/64* (2013.01); *G06F 21/645* (2013.01);
(Continued)

(58) Field of Classification Search
CPC . H04L 2209/38; H04L 9/0643; H04L 9/3236; H04L 63/12; H04L 63/123;
(Continued)

(56) References Cited

U.S. PATENT DOCUMENTS 6,490,513 B1 * 12/2002 Fish .................. G07C 5/085
701/32.6
10,521,780 B1 * 12/2019 Hopkins, III .......... G06Q 20/12
(Continued)

FOREIGN PATENT DOCUMENTS

| DE | 101 31 579 A1 | 1/2003 | |
|---|---|---|---|
| DE | 10 2014 224 202 A1 | 6/2016 | |
| WO | WO-2011063300 A1 * | 5/2011 | ............ G06F 9/4411 |

OTHER PUBLICATIONS

"Blockchain Underpinnings: Hashing", Jan. 9, 2017, obtained online from <https://web.archive.org/web/20170109120335/https://medium.com/@ConsenSys/blockchain-underpinnings-hashing-7f4746cbd66b>, retrieved on Nov. 11, 2021 (Year: 2017).*
(Continued)

*Primary Examiner* — Farid Homayounmehr
*Assistant Examiner* — Zhimei Zhu
(74) *Attorney, Agent, or Firm* — Crowell & Moring LLP

(57) ABSTRACT

A method for providing a data record of a vehicle to a third party includes: receiving a cryptographic key pair including a public, cryptographic key and a private, cryptographic key; receiving the data record of the vehicle; encrypting the received data record by the public, cryptographic key; transmitting the encrypted data record to a data memory for storing the encrypted data record; generating a cryptographic hash value for the encrypted data record; transmitting the hash value of the encrypted data record to a blockchain database for storing the hash value of the encrypted data record; receiving a request message from a third party for retrieving the data record; generating a first
(Continued)

request message to the data memory and a second request message to the blockchain database on the basis of the received request message; transmitting the first request message to the data memory and the second request message to the blockchain database; receiving the encrypted data record from the data memory in response to the first request message and the hash value of the encrypted data record from the blockchain database in response to the second request message; validating the encrypted data record by the hash value; and, when validation of the encrypted data record is successful: decrypting the encrypted data record by the private, cryptographic key; and transmitting the data record in response to the request message from the third party to a server of the third party.

20 Claims, 1 Drawing Sheet

(51) Int. Cl.
| | | |
|---|---|---|
| *G06F 16/27* | (2019.01) | |
| *H04L 9/00* | (2022.01) | |
| *H04L 9/06* | (2006.01) | |
| *H04L 9/32* | (2006.01) | |
| *H04L 29/06* | (2006.01) | |

(52) U.S. Cl.
CPC ............ *H04L 9/006* (2013.01); *H04L 9/0637* (2013.01); *H04L 9/0643* (2013.01); *H04L 9/3239* (2013.01); *H04L 63/12* (2013.01); *G06Q 2220/00* (2013.01); *H04L 2209/38* (2013.01); *H04L 2209/84* (2013.01)

(58) Field of Classification Search
CPC ..... H04L 9/3242; H04L 67/12; H04L 9/3247; H04L 63/0428; H04L 2209/84; H04L 9/3239
See application file for complete search history.

(56) References Cited

U.S. PATENT DOCUMENTS

| | | | |
|---|---|---|---|
| 11,037,246 B1* | 6/2021 | Leise | G07C 5/085 |
| 2008/0306651 A1* | 12/2008 | Davis | H04L 67/06 |
| | | | 701/33.4 |
| 2011/0286596 A1* | 11/2011 | Gressel | H04L 63/12 |
| | | | 380/268 |
| 2013/0058477 A1* | 3/2013 | Kobayashi | G06F 21/10 |
| | | | 380/28 |
| 2013/0212577 A1* | 8/2013 | Nayak | H04L 67/16 |
| | | | 718/1 |
| 2014/0019522 A1* | 1/2014 | Weng | G06F 16/903 |
| | | | 709/203 |
| 2014/0325231 A1 | 10/2014 | Hook et al. | |
| 2015/0379510 A1 | 12/2015 | Smith | |
| 2016/0323741 A1 | 11/2016 | Lee et al. | |
| 2016/0330027 A1 | 11/2016 | Ebrahimi | |
| 2016/0330035 A1 | 11/2016 | Ebrahimi et al. | |
| 2018/0018723 A1* | 1/2018 | Nagla | H04L 63/08 |
| 2018/0091596 A1* | 3/2018 | Alvarez | H04L 9/3239 |
| 2019/0220624 A1* | 7/2019 | Uhr | G06Q 20/02 |
| 2019/0349733 A1* | 11/2019 | Nolan | H04L 9/3239 |

OTHER PUBLICATIONS

International Search Report (PCT/ISA/210) issued in PCT Application No. PCT/EP2018/061171 dated Jul. 31, 2018 with English translation (five pages).
German-language Written Opinion (PCT/ISA/237) issued in PCT Application No. PCT/EP2018/061171 dated Jul. 31, 2018 (seven pages).
German-language Search Report issued in counterpart German Application No. 10 2017 208 503.7 dated Mar. 29, 2018 with partial English translation (15 pages).
"Vertraulichkeitsschutz durch Verschluesselung", Strategien und Loesungen fuer Unternehmen, Hessisches Ministerium fuer Wirtschaft, Energie, Verkehr und Landesentwicklung, 2015, 75 pages.

* cited by examiner

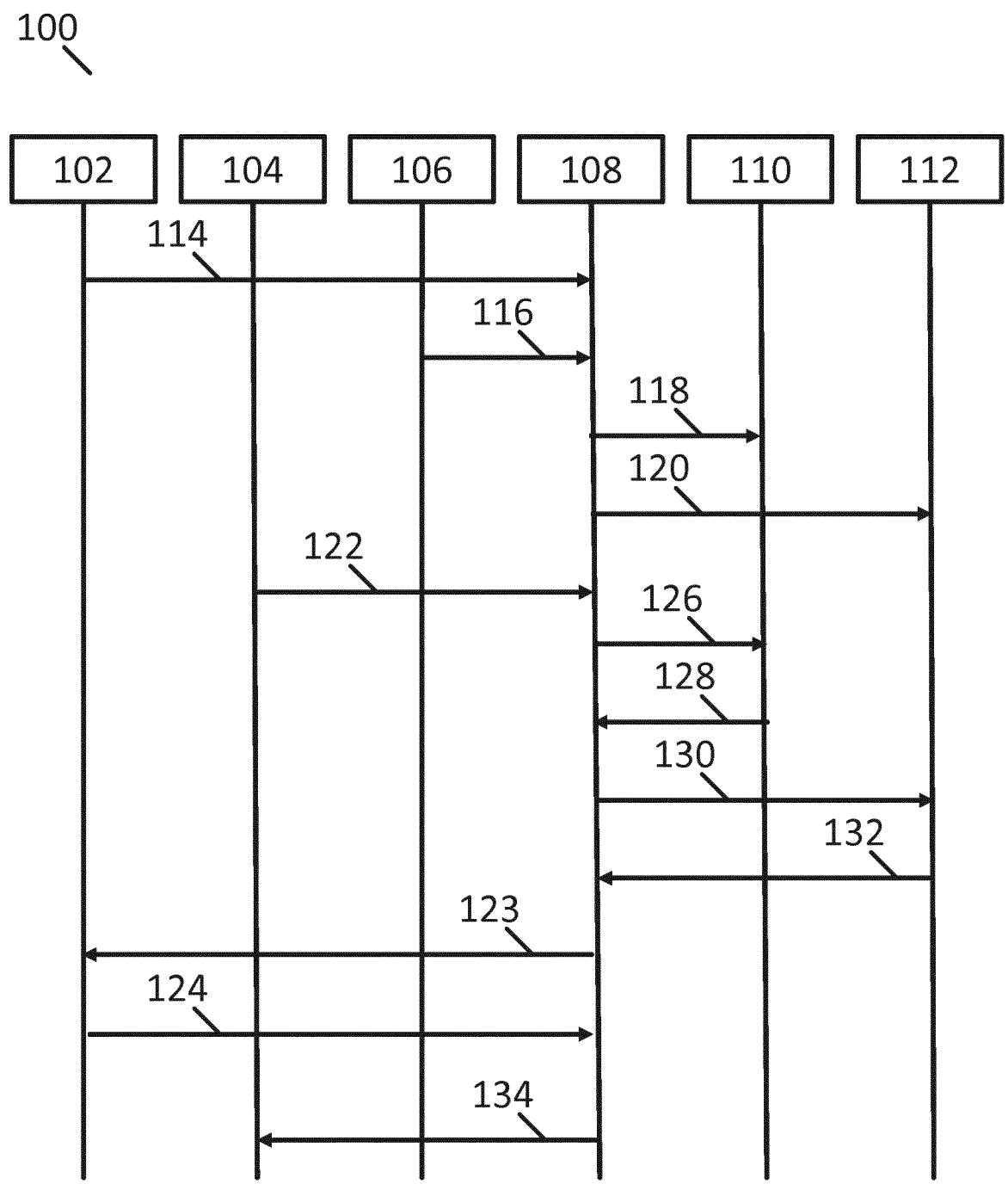

METHOD, COMPUTER-READABLE MEDIUM, SYSTEM AND VEHICLE COMPRISING THE SYSTEM FOR PROVIDING A DATA RECORD OF A VEHICLE TO A THIRD PARTY

CROSS REFERENCE TO RELATED APPLICATIONS

This application is a continuation of PCT International Application No. PCT/EP2018/061171, filed May 2, 2018, which claims priority under 35 U.S.C. § 119 from German Patent Application No. 10 2017 208 503.7, filed May 19, 2017, the entire disclosures of which are herein expressly incorporated by reference.

BACKGROUND AND SUMMARY OF THE INVENTION

The invention relates to a method for providing a dataset of a vehicle to a third party. The invention relates in particular to a computer-readable medium, to a system, and to a vehicle comprising the system for providing a dataset of a vehicle to a third party.

Networked vehicles, that is to say data of the vehicles are able to be transmitted from the vehicles to a central back-end server and received by a central back-end server, are known. The data of the vehicles are able to be distributed by the central back-end server to a server of a third party. To retrieve the data from the central back-end server, a third party may register on the central back-end server and retrieve these data from the central back-end server.

One object of the invention is therefore to efficiently increase the security, in particular the information security, and/or the transparency in the case of providing a dataset of a vehicle to third parties. One object of the invention is in particular to efficiently improve the confidentiality and/or the integrity of a dataset of a vehicle in the case of providing the dataset to third parties.

This object is achieved by the features of the independent claims. Advantageous configurations and developments of the invention emerge from the dependent claims.

According to a first aspect, the invention is distinguished by a method for providing a dataset of a vehicle to a third party. Providing the dataset may comprise distributing the dataset over a communication network from the vehicle to a server of a vehicle manufacturer and/or to a server of the third party. A dataset may comprise a datum or a plurality of data of the vehicle, in particular a datum or a plurality of data of one or more sensors, actuators and/or of one or more controllers of the vehicle. In addition or as an alternative, a dataset may comprise surroundings data of the vehicle and/or user data of the vehicle. The method comprises receiving a cryptographic key pair comprising a private and a public cryptographic key. As an alternative, the method may receive a plurality of cryptographic key pairs. By way of example, a cryptographic key pair may be linked to an owner of the vehicle, a key pair may be linked to a proprietor of the vehicle, and/or a key pair may be linked to a driver or occupant of the vehicle. The cryptographic key pair or a key, for example, the private cryptographic key or the public cryptographic key, of the cryptographic key pair may be stored on a mobile terminal of the owner of the vehicle, of the proprietor of the vehicle, of the vehicle user, and/or of the vehicle occupant, on a controller of the vehicle or on another data carrier such as a smart card. By way of example, the private cryptographic key may be stored on a secure element of the mobile terminal or on the controller or on a smart card. Only the public cryptographic key of the cryptographic key pair is preferably stored in the vehicle. The private cryptographic key of the cryptographic key pair is preferably stored in the mobile terminal, for example in a vehicle key of the owner of the vehicle. The method furthermore comprises receiving the dataset of the vehicle, and encrypting the received dataset by way of the public cryptographic key. The method furthermore comprises transmitting the encrypted dataset to a data memory, for example, a database server, in order to store the encrypted dataset, generating a hash value of the encrypted dataset by way of the private cryptographic key of the owner of the vehicle, and transmitting the hash value of the encrypted dataset to a distributed, decentralized database, for example, a blockchain database, in order to store the hash value of the encrypted dataset.

The method further comprises receiving a request message from a third party to retrieve the dataset, generating a first request message to the data memory and a second request message to the blockchain database depending on the received request message, transmitting the first request message to the data memory and the second request message to the blockchain database, and receiving the encrypted dataset from the data memory in response to the first request message and the hash value of the encrypted dataset from the blockchain database in response to the second request message. The method validates the encrypted dataset by way of the hash value, decrypts the encrypted dataset by way of the private cryptographic key, if the validation of the encrypted dataset is successful, and transmits the dataset to a server of the third party in response to the request message from the third party. If the private cryptographic key is not available in the decryption of the encrypted dataset, the encrypted dataset may be transmitted to a device, for example a mobile terminal or a controller of the vehicle, in order to decrypt the encrypted dataset on this device by way of the private cryptographic key. As an alternative, in the decryption of the encrypted dataset, the private cryptographic key may be requested on a device, for example, on a mobile terminal or a controller, and transmitted to a device that executes the method, in order to decrypt the encrypted dataset. By way of example, the cryptographic key pair may be linked to a person, for example, the owner, the proprietor, the driver, or an occupant. The person may authorize access to the private cryptographic key for a third party.

Advantageously, the security and the transparency of providing the vehicle data is efficiently able to be increased by storing the hash value of the encrypted dataset in the blockchain database. A third party is able to transparently check, by virtue of the hash value being stored in the blockchain database, which datasets are stored in the blockchain. The owner of the vehicle may furthermore, for example, authorize access to the dataset and therefore control access to the dataset or parts of the dataset. The confidentiality of the dataset for the owner of the vehicle is furthermore able to be ensured by encrypting the dataset in the data memory and storing the hash value in the blockchain database. The integrity of the dataset is able to be ensured for the third party by storing the hash value in the blockchain database. The third party is thus able to efficiently detect changes of the dataset of the vehicle. The dataset of the vehicle is thus able to be accessed transparently and without discrimination by the third party.

According to one advantageous configuration, the dataset of the vehicle may comprise a preferably unique identifier that identifies the vehicle and/or an owner and/or a proprietor and/or an occupant of the vehicle. By way of this configuration, the dataset is able to be assigned unambiguously to one person and/or one vehicle.

According to a further advantageous configuration, the method may include receiving an executable program code from the owner of the vehicle, wherein the executable program code is linked to the dataset of the vehicle, and/or wherein the executable program code comprises commands that are executed upon a request for the dataset by the third party and check access to the dataset by the third party. By way of this method, access to the dataset of the vehicle is able to be controlled flexibly by the owner of the vehicle and/or a vehicle manufacturer.

According to a further advantageous configuration, receiving the request message from the third party to retrieve the dataset may comprise executing the executable program code to which the dataset is linked and, if the executed program code indicates that the third party is permitted to access the dataset, generating a first request message to the data memory and a second request message to the blockchain database depending on the received request message, transmitting the first request message to the data memory and the second request message to the blockchain database, receiving the encrypted dataset from the data memory in response to the first request message and the hash value of the encrypted dataset from the blockchain database in response to the second request message, and validating the encrypted dataset by way of the hash value. If the validation of the encrypted dataset is successful, the method may decrypt the encrypted dataset by way of the private cryptographic key, and transmit the dataset to a server of the third party in response to the request message from the third party. Accordingly, access to the dataset of the vehicle is able to be controlled flexibly by the owner of the vehicle and/or the vehicle manufacturer.

According to a further advantageous configuration, the executable program code may be a script or the executable program code may be a smart contract script. A smart contract script comprises instructions that implement control operations on a preferably digital contract. By way of example, a smart contract script may comprise instructions that control access to data and/or processing of data that are linked to the smart contract script. Thus, access to and processing of data are able to be controlled transparently and flexibly by an owner of a vehicle and/or by the vehicle manufacturer.

According to a further aspect, the invention is distinguished by a computer-readable medium for providing a dataset of a vehicle, wherein the computer-readable medium comprises instructions that, when executed on a computer, execute the method described above.

According to a further aspect, the invention is distinguished by a system for providing a dataset of a vehicle, wherein the system comprises a processor that is designed to execute the method described above.

According to a further aspect, the invention is distinguished by a vehicle comprising a system, as described above, for providing a dataset of a vehicle.

Further features of the invention emerge from the claims, the figures and the description of the FIGURES. All of the features and combinations of features cited above in the description and the features and combinations of features cited below in the description of the figures and/or shown on their own in the figures are able to be applied not only in the respectively specified combination but also in other combinations or else on their own.

Other objects, advantages and novel features of the present invention will become apparent from the following detailed description of one or more preferred embodiments when considered in conjunction with the accompanying drawing.

BRIEF DESCRIPTION OF THE DRAWING

A preferred exemplary embodiment of the invention is described below with reference to the attached drawings. Further details, preferred configurations and developments of the invention emerge therefrom. Specifically, FIG. 1 schematically shows an exemplary flowchart of a method for providing a dataset of a vehicle to a third party.

DETAILED DESCRIPTION OF THE DRAWING

In detail, FIG. 1 shows an exemplary flowchart 100 of a method for providing a dataset of a vehicle 106 to a third party 104. An application 108 may implement the method. The application 108 may, for example, be executed on a back-end server of a manufacturer of the vehicle 106. The application may be a distributed application, that is to say part of the application may be executed on a controller of the vehicle, for example, encrypting and storing the dataset, and part may be executed on the back-end server of the manufacturer, for example, validating and decrypting the dataset. The application 108 may receive 114 a cryptographic key pair, preferably at least one public cryptographic key of the cryptographic key pair, from an owner 102, in particular from a preferably mobile terminal of the owner 102 of the vehicle 106, for example, from a computer, a smartphone, or a key. The public and optionally the private cryptographic key of the owner 102 of the vehicle 106 may be received over an encrypted communication connection. As an alternative, the cryptographic key may be stored in a key database of the back-end server of the vehicle manufacturer and be retrieved from the key database by the application 108. The application 108 may furthermore receive 116 a dataset or a plurality of datasets of the vehicle 106. The dataset or the datasets of the vehicle 106 may be received by the application 108 over an encrypted, wireless or wired communication connection to the vehicle 106. The application 108 may receive a dataset or datasets from the vehicle 106 by way of communication in accordance with a push or pull principle.

The application 108 is able to encrypt the received dataset or datasets by way of the public cryptographic key, which is stored, for example, in a key database of the application 108 and/or in the vehicle 106, and transmit 118 the encrypted dataset or the encrypted datasets to a data memory 110 in order to store the encrypted dataset or the encrypted datasets. The data memory 110 may be a database or a file system of a non-volatile memory. The data memory 110 may be a central data memory. By way of example, the data memory 110 may be a relational database of the back-end of the vehicle manufacturer. The application 108 may furthermore generate a hash value of the encrypted dataset and transmit 120 the hash value of the encrypted dataset or the encrypted datasets to a blockchain database 112 in order to store the hash value of the encrypted dataset or the encrypted datasets. The transmission and storage of the encrypted dataset and of the associated hash value may be performed in parallel or sequentially by the application 108. The application 108 may preferably receive a confirmation message about storage of the encrypted dataset and of the associated hash value that has taken place.

The application 108 may additionally receive an executable program code, for example a smart contract script, from the owner 102 of the vehicle 106 and/or from the vehicle 106. The executable program code comprises instructions and/or a protocol that may comprise access to the dataset, changes to the dataset, and/or processing rules of the dataset. The executable program code may be received with the dataset of the vehicle 106. The executable program code may be received from the owner 102 of the vehicle and be linked to the dataset of the vehicle 106. The application 108 may execute the executable program code.

In addition or as an alternative, the application 108 may transmit the executable program code, preferably together with the hash value of the encrypted dataset, to the blockchain database 112. The executable program code may be linked to the hash value of the dataset. The blockchain database may store the executable program code and execute it each time the stored hash value is accessed. The application may furthermore receive a change of the executable program code from the owner 102 of the vehicle and/or the vehicle and transmit it to the blockchain database 112. The blockchain database 112 may receive and store the change of the executable program code, such that the changed executable program code is executed when the hash value of the dataset is accessed.

In order to retrieve the encrypted dataset and the associated hash value, the application 108 may receive 122 a request message from a third party 104, in particular from a server of the third party 104, to retrieve the dataset or the datasets of the vehicle 106. The request message may for example unambiguously identify the owner 102, the vehicle 106, a component of the vehicle 106, and/or the dataset or datasets of the vehicle 106. The third party 104 may authenticate himself to the application 108 by way of known authentication methods before sending the request message to the application 108. The application 108 may preferably only receive the request message from the third party 104 if the third party 104 has successfully authenticated himself to the application 108.

The application 108 may furthermore execute the executable program code that is linked to the dataset requested by the third party 104. If the executed program code indicates that the third party 104 is permitted to access the dataset and/or to process the dataset, the application 108 may execute the steps of the method that are described below. Otherwise, the application 108 may transmit a message to the third party 104 that indicates that the third party 104 is not authorized to access the dataset and/or to process the dataset.

Depending on the received request message from the third party 104, the application 108 may generate a first request message to the data memory 110 and transmit 126 the first request message to the data memory 110. In response to the first request message, the application 108 may receive 128 the encrypted dataset from the data memory 110.

The application 108 may validate the encrypted dataset received from the data memory 110 by way of the hash value received from the blockchain database 112. If the validation of the encrypted dataset by the application 108 is successful, the encrypted dataset may be decrypted by way of the private cryptographic key. To this end, the application 108 may read the private cryptographic key from the key database of the application 108.

If the private cryptographic key of the owner 102 of the vehicle 106 is not available to the application 108, the application 108 may transmit 123 the dataset to be decrypted to the owner of the vehicle 102 for decryption by way of the private cryptographic key of the owner of the vehicle and receive 124 the decrypted dataset again.

Depending on the received request message from the third party 104, the application 108 may generate a second request message and transmit 130 the second request message to the blockchain database 112. In response to the second request message, the blockchain database 112 may transmit the hash value of the encrypted dataset to the application 108. Finally, the application 108 may transmit 134 the dataset over a preferably encrypted communication connection to the third party 104, in particular to a server of the third party 104, in response to the request message from the third party 104.

By using a blockchain database, the integrity and trustworthiness of the datasets of the vehicle are advantageously efficiently able to be increased. No central server is required to distribute the datasets of a vehicle to third parties, with simultaneous transparency for the third party and data security for the owner of the vehicle. The owner of the vehicle is able to flexibly define who is allowed to access and/or process the datasets of the vehicle, by way of a smart contract or a smart contract script. The owner of the vehicle is able to flexibly adjust the smart contract script and thus control access to and processing of the datasets of his vehicle. For the third party, using the blockchain database has the advantage that the third party is always able to transparently check whether the datasets of the vehicle have been changed or are incomplete. The third party is thus able to access the datasets of the vehicle without discrimination and process them, provided that the smart contract script of the owner of the vehicle allows this. Confidentiality is additionally ensured by way of the encrypted storage and the encrypted distribution of the datasets.

LIST OF REFERENCE SIGNS 100 flowchart
102 owner
104 third party
106 vehicle
108 application or app
110 data memory
112 blockchain database
114 receive a private cryptographic key
116 receive a dataset of a vehicle
118 transmit the encrypted dataset
120 transmit the hash value
122 receive a request message
123 transmit a message to transmit the private cryptographic key
124 receive a private cryptographic key
126 transmit a first request message
128 receive a response to the first request message
130 transmit a second request message
132 transmit a response to the second request message
134 transmit the dataset to the third party The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing a dataset of a vehicle to a third party, the method comprising:

receiving a cryptographic key pair comprising a public cryptographic key and a private cryptographic key;

receiving the dataset of the vehicle;
encrypting the received dataset by way of the public cryptographic key;
transmitting the encrypted dataset to a data memory in order to store the encrypted dataset;
generating a cryptographic hash value of the encrypted dataset;
transmitting the hash value of the encrypted dataset to a blockchain database in order to store the hash value of the encrypted dataset;
receiving a request message from a third party to retrieve the dataset;
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

2. The method according to claim 1, wherein the dataset of the vehicle comprises a unique identifier that identifies at least one of the vehicle, an owner of the vehicle, a proprietor of the vehicle, and an occupant of the vehicle.

3. The method according to claim 2, further comprising:
receiving an executable program code from the owner of the vehicle,
wherein the executable program code is linked to the dataset of the vehicle, and/or
wherein the executable program code comprises commands that are executed upon a request for the dataset by the third party and check access to the dataset by the third party.

4. The method according to claim 3, wherein receiving the request message from the third party to retrieve the dataset comprises:
executing the executable program code to which the dataset is linked;
when the executed program code indicates that the third party is permitted to access the dataset:
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

5. The method according to claim 4, wherein the executable program code is a script; and/or
wherein the executable program code is a smart contract script.

6. The method according to claim 3, wherein the executable program code is a script; and/or
wherein the executable program code is a smart contract script.

7. The method according to claim 1, further comprising:
receiving an executable program code from the owner of the vehicle,
wherein the executable program code is linked to the dataset of the vehicle, and/or
wherein the executable program code comprises commands that are executed upon a request for the dataset by the third party and check access to the dataset by the third party.

8. The method according to claim 7, wherein receiving the request message from the third party to retrieve the dataset comprises:
executing the executable program code to which the dataset is linked;
when the executed program code indicates that the third party is permitted to access the dataset:
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

9. The method according to claim 8, wherein the executable program code is a script; and/or
wherein the executable program code is a smart contract script.

10. The method according to claim 7, wherein the executable program code is a script; and/or
wherein the executable program code is a smart contract script.

11. A system for providing a dataset of a vehicle, wherein the system comprises a processor that is designed to execute the method according to claim 1.

12. A vehicle comprising a system for providing a dataset of a vehicle according to claim 11.

13. A non-transitory computer-readable medium for providing a dataset of a vehicle, wherein the computer-readable medium comprises instructions that, when executed on a computer, execute a method comprising:
receiving a cryptographic key pair comprising a public cryptographic key and a private cryptographic key;
receiving the dataset of the vehicle;

encrypting the received dataset by way of the public cryptographic key;
transmitting the encrypted dataset to a data memory in order to store the encrypted dataset;
generating a cryptographic hash value of the encrypted dataset;
transmitting the hash value of the encrypted dataset to a blockchain database in order to store the hash value of the encrypted dataset;
receiving a request message from a third party to retrieve the dataset;
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

14. The non-transitory computer-readable medium according to claim 13, wherein the dataset of the vehicle comprises a unique identifier that identifies at least one of the vehicle, an owner of the vehicle, a proprietor of the vehicle, and an occupant of the vehicle.

15. The non-transitory computer-readable medium according to claim 14,
receiving an executable program code from the owner of the vehicle,
wherein the executable program code is linked to the dataset of the vehicle, and/or
wherein the executable program code comprises commands that are executed upon a request for the dataset by the third party and check access to the dataset by the third party.

16. The non-transitory computer-readable medium according to claim 15, wherein receiving the request message from the third party to retrieve the dataset comprises:
executing the executable program code to which the dataset is linked;
when the executed program code indicates that the third party is permitted to access the dataset:
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

17. The non-transitory computer-readable medium according to claim 13, wherein the computer-readable medium further comprises instructions that, when executed on the computer, execute the method comprising:
receiving an executable program code from the owner of the vehicle,
wherein the executable program code is linked to the dataset of the vehicle, and/or
wherein the executable program code comprises commands that are executed upon a request for the dataset by the third party and check access to the dataset by the third party.

18. The non-transitory computer-readable medium according to claim 17, wherein the computer-readable medium further comprises instructions that, when executed on the computer, execute the method comprising:
executing the executable program code to which the dataset is linked;
when the executed program code indicates that the third party is permitted to access the dataset:
generating a first request message to the data memory and a second request message to the blockchain database depending on the received request message;
transmitting the first request message to the data memory and the second request message to the blockchain database;
receiving the encrypted dataset from the data memory in response to the first request message and the hash value of the encrypted dataset from the blockchain database in response to the second request message;
validating the encrypted dataset by way of the hash value; and
when the validation of the encrypted dataset is successful:
decrypting the encrypted dataset by way of the private cryptographic key; and
transmitting the dataset to a server of the third party in response to the request message from the third party.

19. The non-transitory computer-readable medium according to claim 18,
wherein the executable program code is a script; and/or
wherein the executable program code is a smart contract script.

20. The non-transitory computer-readable medium according to claim 17,
wherein the executable program code is a script; and/or
wherein the executable program code is a smart contract script.

* * * * *